United States Patent Office 3,164,063
Patented Jan. 5, 1965

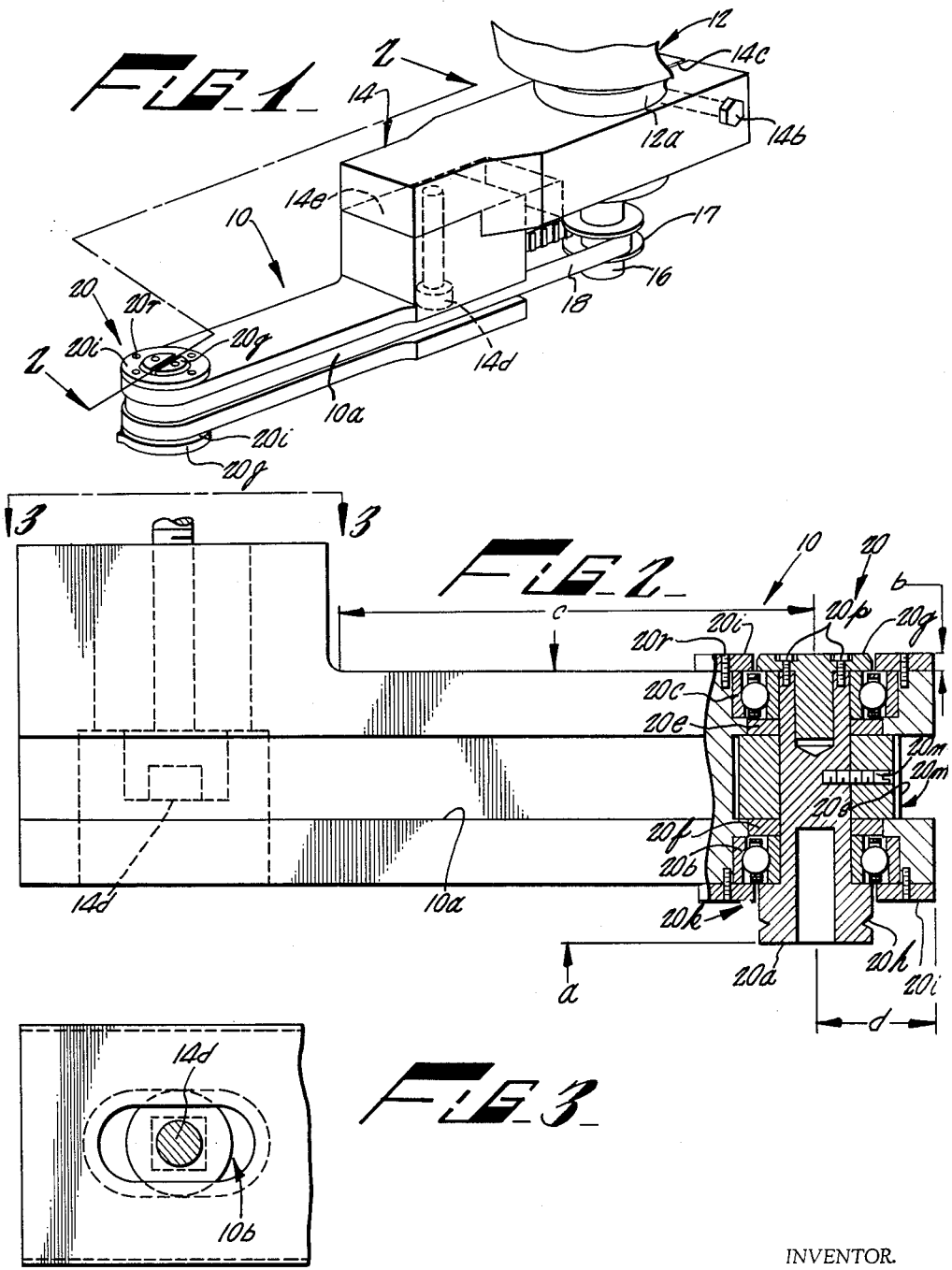

3,164,063
EXTENSION MILLING HEAD
Harold W. Sherman, Inglewood, Calif., assignor to The J. & M. Co., Inglewood, Calif., a corporation of California
Filed Mar. 11, 1963, Ser. No. 264,185
3 Claims. (Cl. 90—17)

This invention relates to milling machines and, more particularly, to a novel cutting tool extension arm for a milling machine.

Many times it is desired to perform milling operations inside small cavities of parts. The space in which the milling operation is to be performed may be extremely small in both height and width. Additionally, it may be necessary to perform the milling operation in such a cavity right up against a wall of the cavity.

A specific example of the present invention is an extension device for the cutting tool of a milling machine which is arranged with a special cutting tool support assembly which may be extended into very small cavities of parts for performing milling operations. Additionally, the extension device is arranged with a special drive assembly so that milling operations may be performed immediately adjacent the side of a wall of a small cavity or even right in a corner of the cavity. The extension device embodying the present invention is extremely small but yet is rigid and has a special preloaded bearing arrangement which prevents chatter in the extension device even under severe loads during milling operations. Additionally, the extension device is arranged so that the distance between the axis of the cutter support shaft and the end of the extension arm is minimized. Further, the adapter, the extension member and the coupling device between the mill spindle and the tool support assembly is arranged for quick mounting and dismounting from the milling machine.

A specific embodiment of the present invention is an extension milling head for a milling machine having a drive spindle and milling machine housing, the combination comprising: cutting tool support shaft means; support means rigidly coupled to the milling machine housing including a rigid and elongated extension thereof having an end extending out spatially from the spindle of such milling machine and bearing means arranged for rotatably mounting said shaft substantially adjacent the spatial end of said extension; and continuous drive means adapted for coupling the shaft means to the spindle of such milling machine.

These and other aspects of the present invention may be more fully understood with reference to the following description of the drawings of which:

FIG. 1 is a pictorial view of a cutting tool extension device mounted on the housing of a milling machine and embodying the present invention;

FIG. 2 is a side elevation view of the extension member, the tool support assembly and a portion of the connecting bolt with a portion of the member and tool support assembly cut away along the line 2—2 shown in FIG. 1 with the cutting tool of FIG. 1 removed; and FIG. 3 is a top elevation view of a portion of the extension member along the line 3—3 of FIG. 2 with the connecting bolt therein.

Refer now to the present invention. FIG. 1 is a pictorial view of an extension device for a milling machine and embodying the present invention. The extension device includes an elongated and rigid member connected to the spindle housing 12a of a milling machine 12 by means of an adapter 14. The adapter 14 contains a circular opening which surrounds the circular spindle housing 12a. The adapter also has a cut extending in from the rear of the adapter into the circular opening and arranged whereby a bolt 14b, extending through the slit 14c and threaded into the adapter 14, may be tightened and pull the sides of the opening into the tight frictional engagement with the housing 12a. The elongated and rigid member or extension member 10 is connected to the adapter 14 by means of a bolt 14d (shown in dashed lines in FIG. 1) and extends out perpendicular to a plane through the axis of the spindle shaft 16 of the milling machine 12.

Referring now to FIGS. 1 and 2, one end of the extension member 10 is positioned out spatially from the spindle shaft 16 and contains a cutting tool support assembly 20. The cutting tool support assembly 20 has a cutting tool support shaft 20a to which various mill cutting tools such as 20j may be mounted.

Referring in particular to FIG. 2 wherein the cutting tool support shaft 20a is shown in section with the cutting tool 20j removed, it will be noted that a V-shaped groove 20h is provided around the outer diameter of the cutting tool support shaft 20a into which set screws may extended for tightly securing cutting tools.

The cutting tool support shaft 20a has two different diameters providing a shoulder on the shaft. A pair of matched bearings 20b and 20c are provided and are securely mounted to the shaft by press-fitting the inner races of the bearings to the shaft 20a. The matched bearings 20b and 20c are angular contact single row ball bearings and, when manufactured, are machined for a preloaded condition. The bearings are arranged for handling both thrust and radial loads during milling operations.

The extension member 10 has two cavities formed adjacent the end which mounts the cutting tool support assembly 20. The first cavity 20k extends through the extension member 10 vertically and parallel with the axis of the shaft 20a. The second cavity 20m extends in from the end of the member 10 parallel with the length of the extension member 10 and in between the matched bearings 20b and 20c. The cavity 20k is arranged forming a recess or bearing housing on the top and bottom of the member 10 for securely mounting the bearings 20b and 20c with the outer races of the bearings secured so that no radial movement will be caused due to loading during milling operations. The cavity 20k is arranged so that the bottom of the recesses are defined by shoulders in the member 10 on which the outer races of the matched bearings 20b and 20c rest.

A coupling device or timing belt pulley 20s is securely mounted to the cutting tool support shaft 20a by means of a set screw 20n. The timing belt pulley 20s is positioned and arranged within the cavity 20m for free rotation.

A pair of spacers 20e and 20f are positioned in between the timing belt pulley 20s and the matched bearings 20b and 20c. The spacers 20b and 20c are dimensioned so that only the inner and not the outer races of the bearings 20b and 20c rest thereon. A cap 20g is connected to the shaft by means of screws 20p and extends over the inner races of the top bearings 20c.

The length of the cutting tool support shaft 20a in between the shoulder and the opposite end thereof, the width of the spacers 20e and 20f and the width of the timing belt pulley 20s are dimensioned such that when the cap 20g is securely tightened down to the end of the cutting tool support shaft 20a, the inner races of the bearings 20b and 20c are forced toward each other with the proper preload to avoid chatter and axial movement of the shaft 20a parallel with its axis caused by loading during milling operations. The proper preload is obtained by dimensioning the widths of the spacers 20e and 20f and the width of the pulley 20s such that the distance between the inner races of the bearings 20b and 20c is slightly less than the distance between the outer races of the bearings 20b and 20c, determined by the dimension between the shoulders in the cavity 20k supporting the outer races of the bearings 20b and 20c.

A pair of support rings 20i are connected to the member 10 by means of screws 20r threaded into the member 10. The supporting rings 20i extend over the outer races of the bearings 20b and 20c and tightly secure the outer races into the bearing housing of the member 10.

The matched bearings 20b and 20c are of the type manufactured by the Marlin Rockwell Corporation and identified as single row duplex radial type R, an angular type bearing having Model No. MRC 7101KRD.

A continuous drive means or timing belt 18 is provided for coupling the timing belt pulley 20s to a timing belt pulley 17 connected to the spindle of the milling machine 12. A timing type of drive belt is important in that it provides greater forces without slipping in the pulleys. The extension member 10 contains a pair of parallel grooves 10a extending along opposite sides of the extension member 10 so that the timing belt 18 may move along the sides of the member 10 and make the proper tangential connection with the teeth of the timing belt pulley 20s.

The axis of the cutting tool support shaft 20a is positioned out as near to the end of the extension member 10 as possible and yet allow the timing belt 18 to remain inside of the end of the extension member 10. In this manner, the extension member 10 can be moved with a cutting tool connected to the shaft 20a as close as possible to the side of a part being milled without obstruction by the belt 18 or the end material of the member 10.

The portion of the extension member 10 connected to the adapter 14 contains an elongated cavity 10b through which the bolt 14d is extended and threaded into the adapter 14. The elongated cavity 10b of the extension member 10 is arranged with a smaller diameter adjacent the adapter 14 to provide a shoulder against which the head of the bolt may be tightened for forcing the extension member 10 into tight engagement with the adapter 14. The cavity 10b is elongated so that the extension member 10 can be moved in and out perpendicular to the axis of the spindle 16 and thereby adjust for the correct tension on the timing belt 18.

The adapter 14 contains a groove 14e (indicated by dashed lines) into which the end of the extension member 10 which engages the adapter 14 fits. The groove 14e is arranged so that it provides a tight fit for the extension member 10 and prevents rotational movement of the extension member 10 in the adapter 14.

In a preferred embodiment of the invention for milling aluminum castings, the extension member 10 is No. 10–18 steel and the adapter 14 is aluminum.

Although a preferred embodiment of the invention has been shown and described herein, it should be understood that other extension milling devices may be devised within the scope of the present invention. For example, although a timing belt 18 is preferred, a chain drive may be used along with sprockets in place of the timing belt pulleys. Also, other continuous driving devices may be used for coupling the spindle and the cutting tool support shaft together. Also, it may be desired to form an angle in the extension member 10 so that the cutting tool may be moved into hard to reach locations of parts being milled.

Listed below are the dimensions indicated by the reference letters shown in FIG. 2 of a preferred extension member and cutting tool support assembly.

| Reference letter: | Dimension, inches |
| --- | --- |
| a | 1.715 |
| b | .100 |
| c | 3.220 |
| d | .780 |

What is claimed is:

1. An extension milling head for a milling machine having a drive spindle with a connected drive pulley and a spindle housing surrounding the spindle, the combination comprising:

a cutting tool assembly comprising a cutting tool support shaft, a pulley mounted to said shaft for rotation thereof, and a bearing positioned on both sides of said pulley for rotatably mounting said shaft; a rigid and elongated mounting member including bearing housing for each bearing for mounting the bearings at substantially a first end of the member, the bearing housings including a portion having a smaller diameter in between the faces of the mounted bearings for rotatably mounting said shaft and preventing motion of the shaft in the member parallel with the axis of the shaft and a recess extending parallel with the length and in between sides of the elongated member for allowing free rotation of the cutting shaft pulley and to allow a drive belt to be coupled to the pulley and move clear of the first end of the member; an adapter arranged for rigidly connecting the member at substantially a second end thereof to a milling machine spindle housing with the first end of the member projecting outwardly from and perpendicular to a plane through the axis of such milling machine spindle; and a drive belt arranged for coupling the rotation of a drive pulley connected to the milling machine spindle to the cutting shaft pulley.

2. An extension milling head for a milling machine having a drive spindle with a connected drive pulley and a spindle housing surrounding the spindle, the combination comprising:

a rigid and elongated mounting member comprising a circular cavity extending therethrough adjacent a first end thereof, a pair of circular recesses for mounting bearings positioned on opposite sides of the member concentric with the cavity and a groove extending in from the first end of the member past the cavity and in between said recesses; a cutting tool assembly comprising a tool support shaft arranged extending out of at least one end of the cavity, a pair of bearings mounted in said recesses and arranged for rotatably mounting said shaft, and a timing belt pulley mounted on said shaft and positioned in said groove with the edge thereof short of the end of the member for rotating the shaft, said cutting tool assembly being arranged with the bearings preloaded and arranged in cooperation with said member for preventing axial movement of said shaft; an adapter arranged for rigidly connecting said member at substantially a second end thereof to a milling machine spindle housing with the first end of said member extending outwardly from and perpendicular to a plane through the axis of such milling machine spindle; and a timing drive belt arranged for coupling the shaft pulley to a timing drive pulley connected to the milling machine spindle.

3. An extension milling head for a milling machine having a drive spindle with a connected drive pulley and a spindle housing surrounding the spindle, the combination comprising:

a rigid and elongated mounting member comprising a circular cavity extending therethrough adjacent a first end thereof, a pair of circular recesses for mounting bearings positioned on opposite sides of the member concentric with the cavity and a groove extending in from the first end of the member past the cavity and in between said recesses; a cutting tool assembly comprising a tool support shaft arranged extending out of at least one end of the cavity; a pair of bearings mounted in said recesses and arranged for rotatably mounting said shaft, and a pulley mounted on said said shaft and positioned in said groove for rotating the shaft, said cutting tool assembly being arranged with the bearings preloaded and arranged in cooperation with said member for preventing axial movement of said shaft; an adapter arranged for rigidly coupling said member at substantially a second end thereof to a milling machine spindle housing with the first end of said member extending outwardly from and perpendicular to the axis of such milling machine spindle, said member including an elongated cavity adapted to receive a connecting member for connecting the adapter to the member and allow adjustment of the member perpendicular to the spindle shaft; and a drive belt arranged for coupling the shaft pulley to a drive pulley connected to the milling machine spindle.

References Cited in the file of this patent

UNITED STATES PATENTS

| | | |
|---|---|---|
| 229,115 | Forbush et al. | June 22, 1880 |
| 1,627,934 | Stein | May 10, 1927 |
| 2,286,931 | Radeke | June 16, 1942 |
| 2,364,328 | Thorsberg | Dec. 5, 1944 |
| 2,519,206 | Van Ausdall | Aug. 15, 1950 |
| 2,669,162 | Arliss | Aug. 15, 1954 |
| 2,718,820 | Faselt | Sept. 27, 1955 |

FOREIGN PATENTS

| | | |
|---|---|---|
| 841,243 | Germany | June 13, 1952 |